US011390190B2

(12) United States Patent
Bouzid et al.

(10) Patent No.: US 11,390,190 B2
(45) Date of Patent: Jul. 19, 2022

(54) SEAT WITH AUTOMATIC TILTING

(71) Applicant: Faurecia Sièges d'Automobile, Nanterre (FR)

(72) Inventors: Farouk Bouzid, Bretigny sur Orge (FR); David Epaud, Guigneville (FR)

(73) Assignee: Faurecia Sièges d'Automobile, Nanterre (FR)

( * ) Notice: Subject to any disclaimer, the term of this patent is extended or adjusted under 35 U.S.C. 154(b) by 16 days.

(21) Appl. No.: 16/133,209

(22) Filed: Sep. 17, 2018

(65) Prior Publication Data
US 2019/0092191 A1    Mar. 28, 2019

(30) Foreign Application Priority Data

Sep. 22, 2017   (FR) ..................... 17 58802

(51) Int. Cl.
| | |
|---|---|
| *B60N 2/02* | (2006.01) |
| *B60N 2/12* | (2006.01) |
| *B60N 2/20* | (2006.01) |
| *B60N 2/90* | (2018.01) |
| *B60N 2/30* | (2006.01) |
| *B60N 2/16* | (2006.01) |

(52) U.S. Cl.
CPC ............. *B60N 2/0232* (2013.01); *B60N 2/12* (2013.01); *B60N 2/164* (2013.01); *B60N 2/20* (2013.01); *B60N 2/309* (2013.01); *B60N 2/3065* (2013.01); *B60N 2/919* (2018.02)

(58) Field of Classification Search
CPC .......... B60N 2/22; B60N 2/0232; B60N 2/20; B60N 2/68; B60N 2/10; B64D 11/064
See application file for complete search history.

(56) References Cited

U.S. PATENT DOCUMENTS

| | | | | | |
|---|---|---|---|---|---|
| 5,454,624 | A | * | 10/1995 | Anglade | B60N 2/0292 297/321 |
| 6,334,643 | B1 | * | 1/2002 | Lindblad | B60N 2/4228 296/65.09 |
| 6,601,900 | B1 | * | 8/2003 | Seibold | B60N 2/0292 296/65.05 |

(Continued)

FOREIGN PATENT DOCUMENTS

| | | |
|---|---|---|
| CN | 101778735 A | 7/2010 |
| CN | 102529763 A | 7/2012 |

(Continued)

OTHER PUBLICATIONS

French Search Report on French application No. FR 1758802, dated May 14, 2018, 6 pages.

*Primary Examiner* — Shin H Kim
(74) *Attorney, Agent, or Firm* — Reising Ethington P.C.

(57) ABSTRACT

A vehicle seat that includes a support intended to be rigidly fixed to the frame of a vehicle, a seating portion, a backrest extending the rear end of the seating portion, and a connecting mechanism which connects the seating portion to the support. The connecting mechanism has a primary mechanism which allows forward tilting of the seating portion and backrest relative to the support between a rest position and a forward-tilted position. The seat includes a first motor able to tilt the seating portion from its rest position to its tilted position, and a control member for the first motor.

3 Claims, 5 Drawing Sheets

(56) References Cited

U.S. PATENT DOCUMENTS

| | | | |
|---|---|---|---|
| 7,552,972 B2* | 6/2009 | Ferrari | B60N 2/01583 |
| | | | 296/65.09 |
| 7,802,850 B2* | 9/2010 | Deißmann | B60N 2/0232 |
| | | | 297/378.12 |
| 8,313,144 B2* | 11/2012 | Holdampf | B60N 2/22 |
| | | | 297/340 |
| 9,073,456 B2 | 7/2015 | Hoshi et al. | |
| 9,914,377 B2* | 3/2018 | Wagner | F16C 1/10 |
| 10,308,146 B1* | 6/2019 | Kish | B60N 2/12 |
| 2007/0132266 A1 | 6/2007 | Ghergheli et al. | |
| 2007/0236068 A1 | 10/2007 | Deissmann et al. | |
| 2011/0095585 A1 | 4/2011 | Kato et al. | |
| 2012/0261963 A1* | 10/2012 | Heyer | B60N 2/0232 |
| | | | 297/313 |
| 2015/0091338 A1* | 4/2015 | Hayashi | B60N 2/5621 |
| | | | 297/180.1 |
| 2016/0114703 A1* | 4/2016 | Fujita | B60N 2/0232 |
| | | | 297/344.1 |
| 2016/0121758 A1* | 5/2016 | Wladimirow | B60N 2/0232 |
| | | | 297/378.12 |
| 2017/0057380 A1 | 3/2017 | Vikstrom et al. | |
| 2017/0232876 A1* | 8/2017 | Shimoda | B60N 2/80 |
| | | | 297/452.3 |

FOREIGN PATENT DOCUMENTS

| | | |
|---|---|---|
| CN | 103153694 A | 6/2013 |
| EP | 1882609 A1 | 1/2008 |
| FR | 2927580 A1 | 8/2009 |
| WO | 2005025931 A1 | 3/2005 |
| WO | WO2005044616 A1 | 5/2005 |

* cited by examiner

SEAT WITH AUTOMATIC TILTING

FIELD OF THE INVENTION

The present invention relates to a vehicle seat comprising: a support intended to be rigidly attached to the frame of a vehicle, a seating portion, a backrest extending the rear end of the seating portion, and a connecting mechanism which connects the seating portion to the support, the connecting mechanism comprising a primary mechanism which allows forward tilting of the seating portion and backrest relative to the support between a rest position and a forward-tilted position.

BACKGROUND OF THE INVENTION

In the description that follows, the terms "front" and "rear" when describing parts of the seat are defined such that the backrest is located at the rear of the seat. The longitudinal direction X designates the direction from rear to front (longitudinal direction).

A front seat of a typical vehicle, for example of a three-door motor vehicle, must be able to tilt forward to allow access to the rear bench seat the vehicle. This tilting comprises a rotation of the seating portion of the seat relative to the support of the seat, this support being rigidly fixed to the vehicle frame.

The axis of rotation Y of the seating portion relative to the support is located towards the front of the seat, such that as it tilts from the rest position to the tilted position, the seating portion and backrest (meaning the upper portion of the seat) tilt forward with a rotational movement about this transverse axis of rotation Y. The axis of rotation Y is perpendicular to the longitudinal direction X.

This clears a space immediately behind the seat to provide a passenger with access to the bench seat in the back of the vehicle, or to allow the passenger to exit the vehicle from this bench seat.

However, the seat represents a significant weight, which may require the passenger to exert significant effort in order to tilt the seat forward to its tilted position.

SUMMARY

An object of the present invention is to overcome this disadvantage.

In particular, an object of the invention is to provide a vehicle seat for which the tilting between its rest position and its forward-tilted position by a passenger is facilitated.

This object may be achieved by providing a seat that comprises a first motor able to tilt the seating portion from the rest position to the tilted position, and a control member for the first motor.

With these arrangements, a passenger who wishes to access the rear bench seat of a vehicle or to exit from this rear bench seat is able to tilt the front seat from its rest position to its tilted position, simply by operating the control member. With minimum effort, the passenger can thus free up space behind the front seat through which he or she can pass.

Advantageously, the seat may further comprise a system for locking the seating portion with the support, a second motor able to transition the locking system from its locked position to its unlocked position, and a control member for the second motor.

The passenger is thus able to unlock the seat and tilt the seat at the same time, without exerting significant effort.

Advantageously, the control member for the first motor may be the control member for the second motor.

The passenger is thus able to unlock and tilt the seat with a single action on the control member.

Advantageously, the connecting mechanism may further comprise a secondary mechanism which allows forward translation of the seating portion relative to the support, exclusively in a longitudinal direction X from the rear towards the front of the seating portion.

By pushing the seat forward, a passenger is thus able to free more space behind the seat.

Advantageously, the seat may comprise a third motor which actuates the secondary mechanism, and a control member for the third motor.

The passenger is thus able to move the seat forward in translation, without exerting significant effort.

Advantageously, the control member for the first motor may be the control member for the third motor.

The passenger is thus able to move the seat forward in translation and tilt it by a single action on the control member.

BRIEF DESCRIPTION OF DRAWINGS

The invention will be better understood and its advantages will be more apparent from reading the detailed description which follows of an embodiment shown as a non-limiting example. The description refers to the accompanying drawings in which.

DETAILED DESCRIPTION

Figure 1:
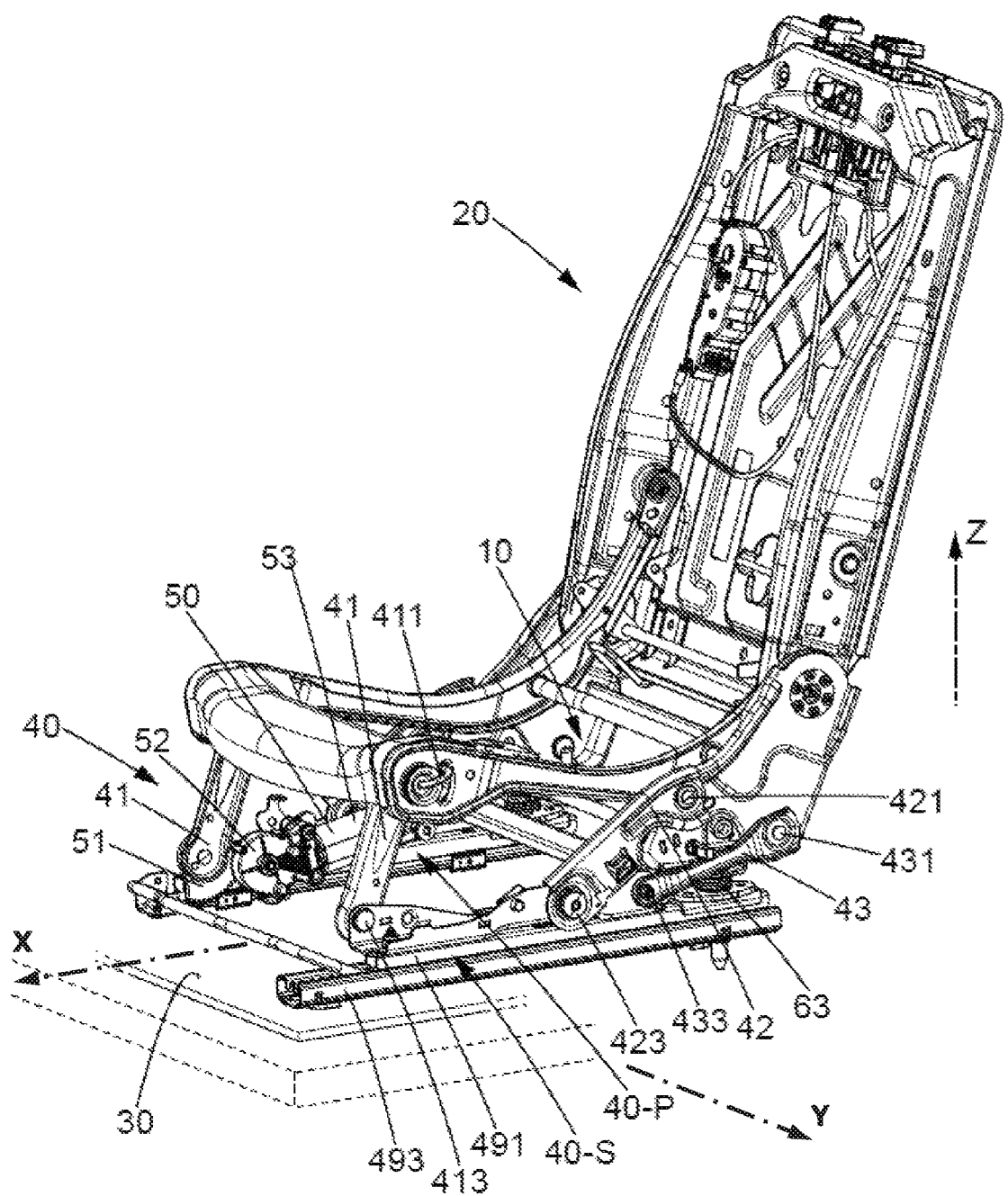
FIG. 1 is a perspective view of a seat according to an embodiment of the invention, in the rest position.

The vehicle seat shown in the figures comprises a seating portion 10 and a backrest 20 which is fixed on this seating portion 10. The seat also comprises a support 30 which is intended to be rigidly fixed to the frame of the vehicle (shown in dotted lines in the figures).

The seating portion 10 designates the portion of the seat which is located beneath the passenger sitting on the seat and whose back rests against the backrest 20.

By convention, the backrest 20 forms the rear portion of the seat, along the rear edge of the seating portion 10. The front edge of the seating portion 10 is the edge opposite the rear edge of the seating portion 10, and is therefore the edge of the seating portion 10 which is farthest from the backrest 20.

In all the figures described below, the seat is represented in the operational position, with the support 30 extending in a horizontal plane. The vertical direction Z is therefore perpendicular to the plane of the support 30.

The seat comprises a rigid structure (meaning it is composed of rigid parts hinged together), for example of metal. The rigid structure is covered with cushioning intended to be in contact with the passenger.

For clarity, the cushioning of the seating portion 10 and backrest 20 of the seat are not represented, so that the rigid structure and its hinges are visible.

The seating portion 10 is connected to the support 30 by a connecting mechanism 40. This connecting mechanism 40 allows forward tilting of the seating portion 10 relative to the support 30 during the transition from the rest position to the tilted position. This tilting therefore comprises a rotation of the seating portion 10 about a transverse axis Y passing through the center of gravity of the seating portion 10, and a primary translation of the seating portion 10 relative to the support 30.

The transverse axis Y is situated in a plane parallel to the support 30 (which is also substantially the plane of the seating portion 10), perpendicular to axis Z and to the longitudinal axis X.

The primary translation has a non-zero vertical component such that during tilting, the center of gravity of the seating portion 10 and the rear of the seating portion 10 rise vertically (along direction Z) relative to the support 30.

The connecting mechanism 40 then consists of a primary mechanism 40-P which enables rotation of the seating portion 10 about its center of gravity and translation of the seating portion 10 relative to the support 30.

Optionally, the tilting of the seating portion 10 further comprises a secondary translation of the seating portion 10 relative to the support 30, this translation able to take place before, during, or after the rotation of the seating portion 10 relative to the support 30. This secondary translation is carried out exclusively in the longitudinal direction X, by a secondary mechanism 40-S.

The secondary mechanism 40-S comprises a guide 493 fixed to the support 30 and oriented in the longitudinal direction X, and a slider 491 which is connected to the primary connecting mechanism 40-P. The slider 491 is able to slide within the guide 493 along the longitudinal direction X.

For example, the guide 493 consists of two parallel tracks located one on each lateral side of the seating portion 10, and the slider 491 consists of two rails (or a plurality of sliding segments) which engage with these tracks so as to slide within them.

In this case, the connecting mechanism 40 is composed of the primary mechanism 40-P and the secondary mechanism 40-S. By allowing forward translation of the seating portion 10, the secondary mechanism 40-S offers the advantage of freeing more space behind the seat for entering the rear bench seat of the vehicle when the seat is in a tilted position.

In all cases, the seating portion 10, and therefore the seat, are able to tilt between a rest position and a tilted position (when speaking of "tilting the seat", this of course excludes the support 30, which remains fixed relative to the chassis of the vehicle).

In all the FIGS. 1 to 6 described below, the connecting mechanism 40 consists of the primary mechanism 40-P and the secondary mechanism 40-S.

The primary mechanism 40-P comprises a front hinge at the front of the seating portion 10, and a rear hinge at the rear of the seating portion 10, which are simultaneously subjected to forces during the tilting of the seat.

Several modes for the front hinge are possible.

For example, the front hinge is a single pivot connection such that the front end of the seat pivots directly relative to the support 30 (or to the slider of the secondary mechanism 40-S if such is present).

For example, as shown in the figures in the present application, the front hinge of the seating portion 10 has two front connecting rods 41, one located on one lateral side of the seating portion 10, the other located on the other lateral side of the seating portion 10. Each front connecting rod 41 connects a front portion of the seating portion 10 to the slider 491 of the secondary mechanism 40-S (when there is no secondary mechanism 40-S, each front connecting rod 41 is connected to part of the support 30). The connection between each front connecting rod 41 and the slider 491 is a first front pivot connection 413, and the connection between each front connecting rod 41 and the seating portion 10 is a second front pivot connection 411.

Advantageously, in comparison to a single pivot, such a front hinge of the seating portion 10 amplifies the forward displacement of the seating portion 10 during tilting.

Several modes for the rear hinge are possible.

For example, as shown in FIGS. 1 to 4, the rear hinge of the seating portion 10 has four bars, namely a forward bar 42 and a rearward bar 43 located on one lateral side of the seating portion 10, and a forward bar 42 and a rearward bar 43 located on the other lateral side of the seating portion 10.

Each forward bar 42 and each rearward bar 43 connects a rear part of the seating portion 10 to the slider 491 of the secondary mechanism 40-S (if there is no secondary mechanism 40-S, each forward bar 42 and each rearward bar 43 is connected to part of the support 30). The connection between each forward bar 42 (rearward bar 43) and the slider 491 is a first forward pivot connection 423 (rearward 433), and the connection between each forward bar 42 (rearward bar 43) and the seating portion 10 is a second forward pivot connection 421 (rearward 431).

Figure 5:
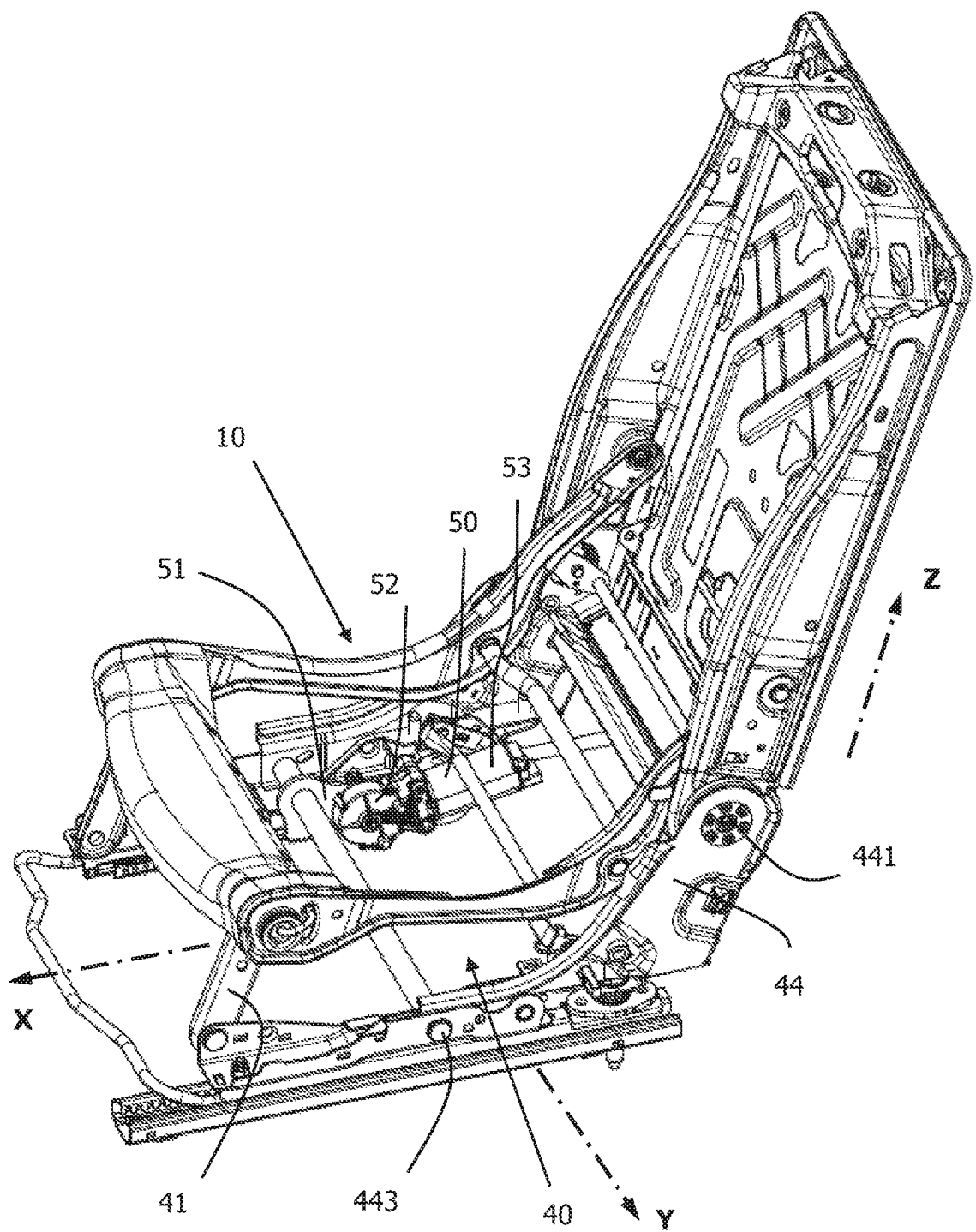
FIG. 5 is a perspective view of another embodiment of a seat according to the invention, in the rest position.
Figure 6:
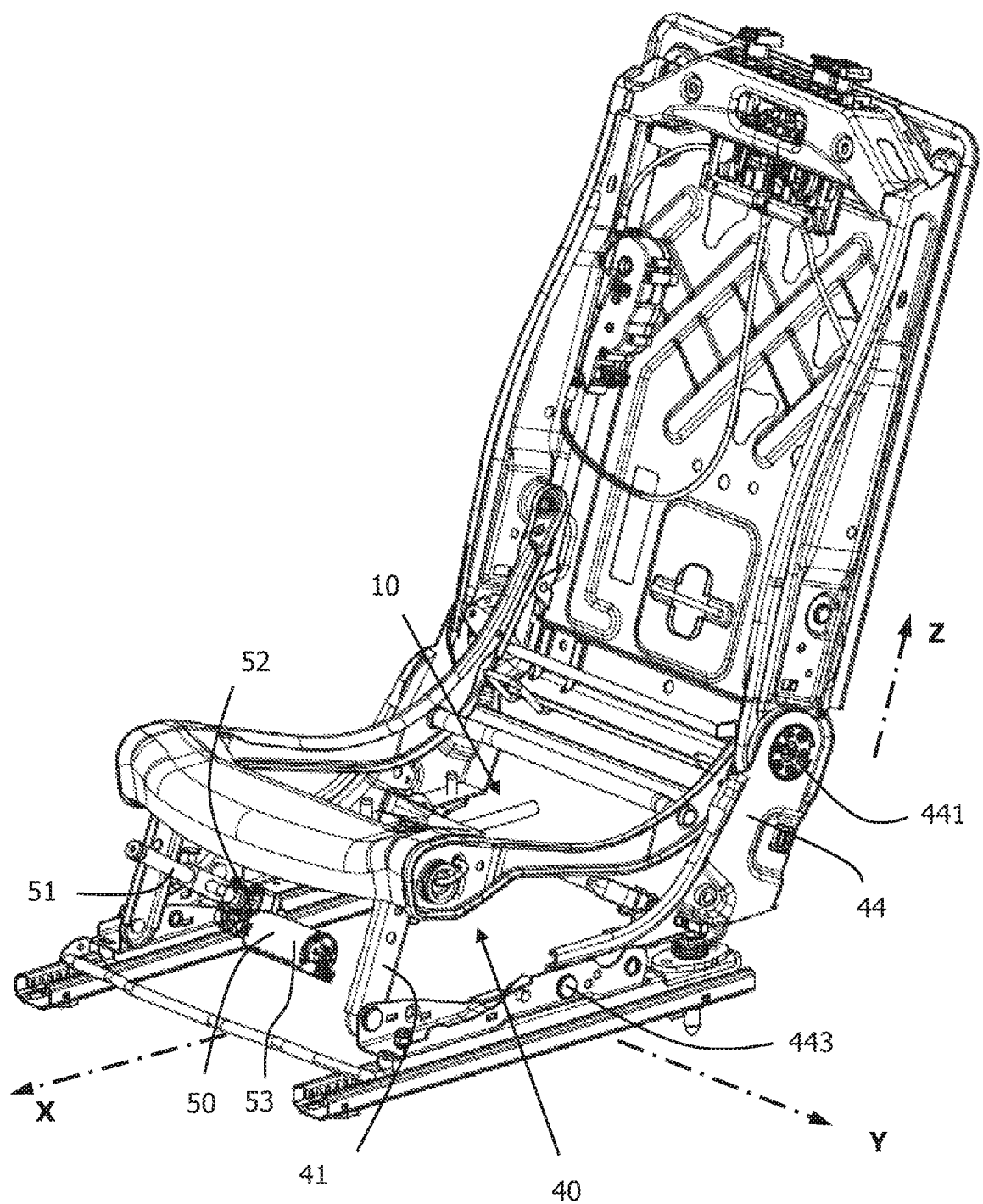
FIG. 6 is a perspective view of yet another embodiment of a seat according to the invention, in the rest position.

Alternatively, as shown in FIGS. 5 and 6, the hinge at the rear of the seating portion 10 comprises two gusset plates 44, one located on one lateral side of the seating portion 10, the other located on the other lateral side of the seating portion. For example, each gusset plate 44 connects the rear end of the seating portion 10 to the slider 491 of the secondary mechanism 40-S (if there is no secondary mechanism 40-S, each gusset plate 44 is connected to part of the support 30). The connection between each gusset plate 44 and the slider 491 is a first gusset pivot connection 443, and the connection between each gusset plate 44 and the seating portion 10 is a second gusset pivot connection 441.

The seat comprises a first motor 50 able to tilt the seating portion 10 from the rest position to the tilted position.

The first motor 50 is associated with the primary connecting mechanism 40-P, in order to tilt the seat automatically.

This tilting of the seat is effected by actuation by the passenger of a control member, such as a switch, provided for the first motor 50 and electrically connected to the first motor 50.

For example, this control member (not shown) is located on the seat. Advantageously, this control member is located at the top of the seat backrest 20 in order to be easily accessible to a passenger.

In a first embodiment of the invention, illustrated in FIGS. 1 to 4, the rear hinge of the seating portion 10 comprises four bars (42, 43) and the first motor 50 rotates one of the front connecting rods 41. The first motor 50 comprises a driving member 53 fixed to the slider 491, an actuator 52 which is set in motion directly by the driving member 53, and a displaceable member 51 which is integral with this front connecting rod 41 (if there is no secondary mechanism 40-S, each driving member 53 is fixed to the support 30). The displaceable member 51 engages with the actuator 52 such that the movement of the actuator 52 displaces the displaceable member 51.

Figure 2:
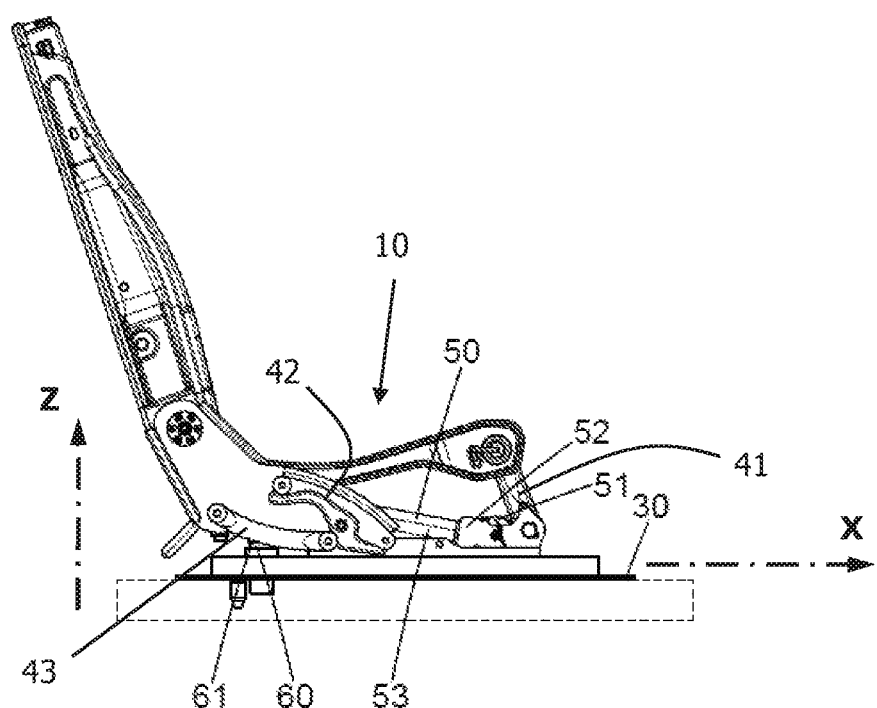
FIG. 2 is a side view of a seat such as shown in FIG. 1, in the rest position.
Figure 3:
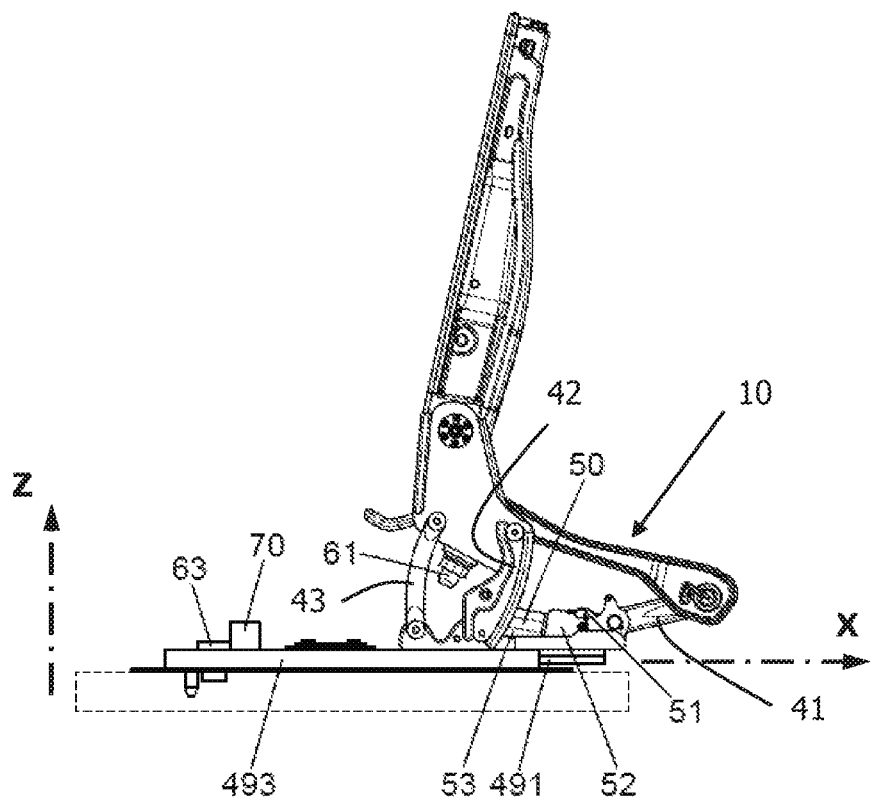
FIG. 3 is a side view of the seat of FIG. 2, in a tilted position.

In a first variant illustrated in FIGS. 1 to 3, the actuator 52 is a pinion, and the displaceable member 51 is a toothed circular sector whose teeth mesh with the teeth of the pinion 52 (see FIG. 1, where the seat is in the rest position). Thus, the driving member 53 rotates the pinion 52, which causes the toothed sector 51 to rotate, which pivots the front connecting rod 41 forward. This pivoting of the front connecting rods 41 causes forward rotation of the forward bars 42 and rearward bars 43 relative to their first forward 423 and rearward 433 pivot connections. This rotation raises the rear of the seating portion 10 and moves the seating portion 10 forward towards its tilted position.

In addition, due to the secondary mechanism 40-S, the passenger can exert a forward-directed force on the seat to slide the slider 491 in the guide 493 and move the seat as a unit in forward translation.

FIG. 2 is a side view which shows the seat in the rest position, and FIG. 3 is a side view which shows the seat in the tilted position, after the first motor 50 is actuated and the seat is tilted by the primary mechanism 40 P, and the seat is moved in forward translation by the secondary mechanism 40-S.

For clarity in FIGS. 4 to 6, described below, only the numerical references most relevant to understanding the figures are indicated. The other references, which designate the same parts, are already shown in FIG. 1.

Figure 4:
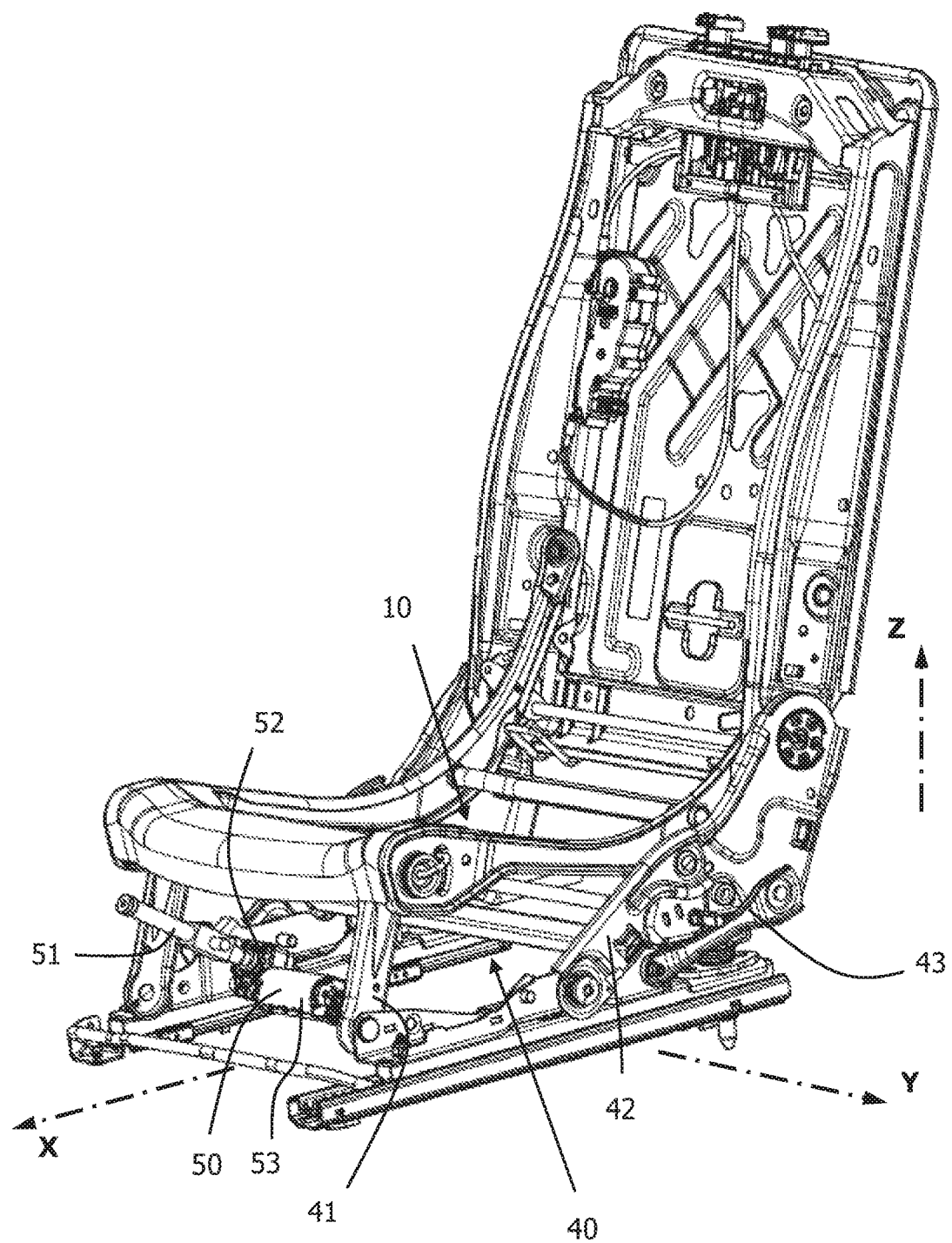
FIG. 4 is a perspective view of a variant of the seat of FIG. 1, in the rest position.

In a second variant illustrated in FIG. 4, the actuator 52 is a pinion and a worm screw, and the displaceable member 51 is a toothed tube of which the teeth mesh with the worm screw (in FIG. 4 the seat is in the rest position). The toothed tube 51 has an end fixed to one of the front connecting rods 41, at a distance from the first front pivot connection 413. The driving motor 53 thus rotates the worm screw, which moves the toothed tube in translation, which causes this front connecting rod 41 to pivot forward about the first front pivot connection 413. The movement of the primary mechanism 40-P and the seat is then identical to the first variant.

In a second embodiment of the invention, illustrated in FIG. 5, the rear hinge of the seating portion 10 comprises two gusset plates 44, and the first motor 50 rotates one of the gusset plates 44.

The first motor 50 comprises a driving member 53 fixed to the slider 491, an actuator 52 which is set in motion directly by the driving member 53, and a displaceable member 51 which is integral with the gusset plate 44 (if there is no secondary mechanism 40-S, each driving member 53 is fixed to the support 30). The displaceable member 51 engages with the actuator 52 such that the movement of the actuator 52 displaces the displaceable member 51.

Similarly to the first variant of the first embodiment described above, the actuator 52 is a pinion, and the displaceable member 51 is a toothed circular sector having teeth that mesh with the teeth of the pinion 52. When the driving member 53 rotates the pinion 52, the toothed sector 51 is rotated, which pivots one of the gusset plates 44 forward, about its first gusset pivot connection 443. This pivoting of the gusset plates 44 raises the rear of the seating portion 10 and moves the seating portion 10 forward towards its tilted position.

In a third embodiment of the invention, illustrated in FIG. 6, the rear hinge of the seating portion 10 comprises two gusset plates 44, and the first motor 50 rotates one of the front connecting rods 41.

Similarly to the second variant of the first embodiment described above, the actuator 52 is a pinion and a worm screw, and the displaceable member 51 is a toothed tube of which the teeth mesh with the worm screw (in FIG. 4 the seat is in the rest position). The toothed tube 51 has one end fixed to one of the front connecting rods 41, at a distance from the first front pivot connection 413. Thus, the driving member 53 rotates the worm screw, which moves the toothed tube in translation, which pivots this front connecting rod 41 forward about the first front pivot connection 413. This pivoting of the front connecting rods 41 causes forward rotation of the gusset plates 44 about their first gusset pivot connection 443, which raises the rear of the seating portion 10 and moves the seating portion 10 forward towards its tilted position.

In all the embodiments described above, the driving member 53 of the first motor 50 is integral with the slider 491 of the secondary mechanism 40-S (or is integral with the support 30 if there is no secondary mechanism 40-S), and the displaceable member 51 is integral with a part of the primary mechanism 40-P.

Alternatively, the driving member 53 of the first motor 50 is integral with a part of the primary mechanism 40-P, and the displaceable member 51 is integral with the slider 491 of the secondary mechanism 40-S (or is integral with the support 30 if there is no secondary mechanism 40-S).

The return of the seat to the rest position from the tilted position is done manually by the passenger.

Alternatively, this return of the seat to the rest position is done by controlling the first motor 50 so as to actuate it in the reverse direction.

According to another embodiment, the seat comprises a system 60 for locking the seat relative to the support 30, and a second motor 70 which is able to move the locking system 60 from its locked position to its unlocked position.

This locking system 60 comprises a male locking element 61 and a female locking element 63, these two locking elements engaging so as to lock the seat in the rest position.

When the locking system 60 is in the unlocked position, the seating portion 10 is free to tilt forward when acted on by the first motor 50.

The male locking element 61 is mounted on the seating portion 10 (respectively the support 30), the female locking element 63 then being mounted on the support 30 (respectively the seating portion 10) (see FIGS. 1 to 3).

For example, the locking system 60 is a "ball fix" system, or a latch system (where the male element 61 is a rod and the female element 63 is a hook).

Alternatively, when the secondary mechanism 40-S is present, the locking system 60 for the seat locks the seat relative to the slider 491 or relative to the support 30.

This locking of the seat is effected by actuation by the passenger of a control member which is provided for the second motor 70 and which is electrically connected to the second motor 70.

Advantageously, the control member which controls the second motor 70 is the same one that controls the first motor 50.

The passenger can thus unlock and tilt the seat with a single action.

In the above description, when the connecting mechanism 40 comprises a secondary mechanism 40-S, movement of the seating portion 10 in longitudinal translation relative to the support 30 is done manually by the passenger.

Alternatively, the seat comprises a third motor (not shown) which is connected to the secondary mechanism 40-S such that the third motor is controlled to cause forward translation of the seating portion 10 relative to the support 30.

Advantageously, the control member which controls the first motor 50 also controls the third motor.

The passenger can thus tilt the seat and also move it in forward translation, with a single control.

For example, the third motor comprises a driving member fixed on the guide 493 or on the support 30, an actuator which is set in motion directly by the driving member, and a displaceable member which is integral with the slider 491. The displaceable member engages with the actuator such that movement of the actuator moves the displaceable member in translation. For example, the actuator is a pinion, and the displaceable member is a toothed rail whose teeth mesh with the teeth of the pinion such that rotation of the pinion moves the rail in translation.

Advantageously, in the case where the seat comprises a first motor 50, a second motor 70, and a third motor as described above, the control member which controls the first motor 50 also controls the second motor 70 and the third motor.

The invention claimed is:

1. Vehicle seat comprising:
   a support intended to be rigidly fixed to the frame of a vehicle,
   a seating portion,
   a backrest extending from a rear of said seating portion,
   a connecting mechanism which connects said seating portion to said support, said connecting mechanism comprising a primary mechanism which allows forward tilting of the seating portion and backrest relative to the support between a rest position and a forward-tilted position,
   a locking system for locking said seating portion with said support,
   a first motor able to tilt said seating portion from said rest position to said forward-tilted position,
   a control member for said first motor,
   a second motor able to transition said locking system from a locked position to an unlocked position, and
   a control member for said second motor,
   wherein the rear of the seating portion and a center of gravity of the seating portion rise vertically relative to the support during said forward tilting,
   wherein the rear of the seating portion remains connected to said support during said forward tilting,
   wherein the primary mechanism comprises a front hinge at a front of the seating portion and a rear hinge at the rear of the seating portion, the front and rear hinges being simultaneously subjected to forces during said forward tilting,
   wherein said connecting mechanism further comprises a secondary mechanism which allows forward translation of said seating portion relative to said support, exclusively in a longitudinal direction from the rear toward a front of said seating portion,
   said seat further comprising a third motor which actuates said secondary mechanism, and a control member for said third motor,
   wherein the control member for said first motor is the control member for said second motor so that a user can tilt the seat and unlock the seat with a single action.

2. Seat according to claim 1, wherein the control member for said first motor is the control member for said third motor so that the user can tilt the seat and move the seat in forward translation with a single action.

3. Vehicle seat comprising:
   a support intended to be rigidly fixed to the frame of a vehicle,
   a seating portion,
   a backrest extending from a rear of said seating portion,
   a connecting mechanism which connects said seating portion to said support, said connecting mechanism comprising a primary mechanism which allows forward tilting of the seating portion and backrest relative to the support between a rest position and a forward-tilted position,
   a locking system for locking said seating portion with said support,
   a first motor able to tilt said seating portion from said rest position to said forward-tilted position,
   a control member for said first motor,
   a second motor able to transition said locking system from a locked position to an unlocked position, and
   a control member for said second motor,
   wherein the rear of the seating portion and a center of gravity of the seating portion rise vertically relative to the support during said forward tilting,
   wherein the rear of the seating portion remains connected to said support during said forward tilting,
   wherein the primary mechanism comprises a front hinge at a front of the seating portion and a rear hinge at the rear of the seating portion, the front and rear hinges being simultaneously subjected to forces during said forward tilting,
   wherein said connecting mechanism further comprises a secondary mechanism which allows forward translation of said seating portion relative to said support, exclusively in a longitudinal direction from the rear toward a front of said seating portion,
   said seat further comprising a third motor which actuates said secondary mechanism, and a control member for said third motor,
   wherein the control member for said first motor is the control member for said third motor so that a user can tilt the seat and move the seat in forward translation with a single action.

* * * * *